LOWTH & HOWE.
Cultivator Tooth.
No. 82,423.
Patented Sept. 22, 1868.
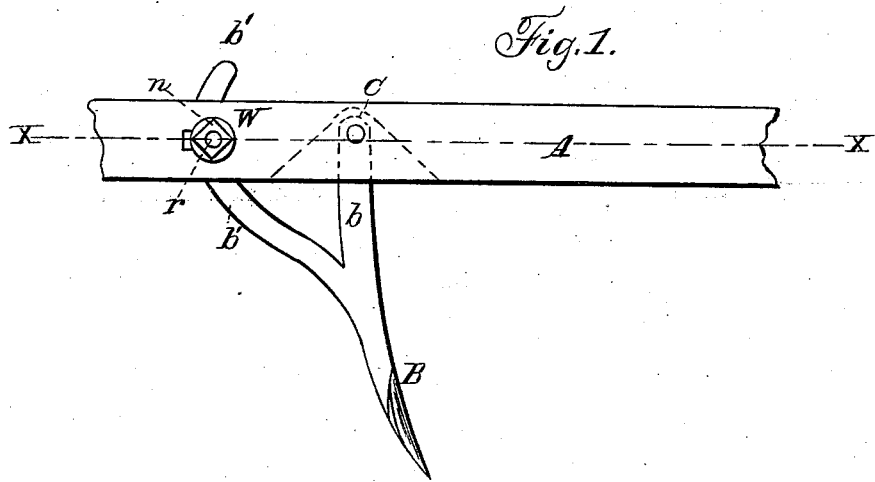
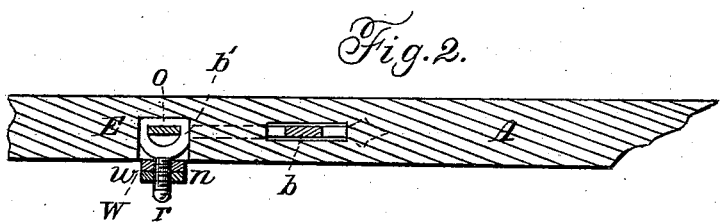
Witnesses:
C. A. Pettit
N. H. Ellsworth
Inventors:
M. F. Lowth and T. J. Howe
By Munn & Co
Attys

United States Patent Office.

M. F. LOWTH AND T. J. HOWE, OF OWATONNA, MINNESOTA.

Letters Patent No. 82,423, dated September 22, 1868.

IMPROVEMENT IN CULTIVATOR.

The Schedule referred to in these Letters Patent and making part of the same.

TO ALL WHOM IT MAY CONCERN:

Be it known that we, M. F. LOWTH and T. J. HOWE, of Owatonna, in the county of Steele, and State of Minnesota, have invented a new and useful Improvement in Cultivators; and we do hereby declare that the following is a full, clear, and exact description of the construction and operation of the same, reference being had to the accompanying drawings, making a part of this specification, in which—

Figure 1 is a side elevation.

Figure 2 is a horizontal section through line $x\ x$ of fig. 1.

This invention has for its object the fastening of the cultivator-tooth to the beam in such a manner that, while it remains firmly in position under any ordinary strain, it will yield when in contact with an immovable obstacle, so as to pass over the obstacle without breaking.

In the drawings, A A represents the cultivator-beam, and B the tooth, which is attached to the beam by two shanks, the forward one a straight shank, $b$, confined to the beam by a bolt, $c$, and the rear one a curved shank, $b'$, its curve being the arc of a circle, the centre of which would coincide with the bolt $c$. The upper end of the rear shank passes through a vertical mortise in the beam A, and is held in position by a stirrup-shaped clamp, E. The clamp E is provided with an oblong or semicircular aperture, O, through which the shank $b'$ passes, the side $o$ of this opening, which bears against the tooth and clamps it in place, being made straight, as seen in fig. 2, and the side of the shank being made flat, so that two straight or flat metallic surfaces bear against each other across the whole width of the shank. By this means the friction between the two will be so great that if the clamp be tightened by means of a screw-shank, $r$, projecting from the body of the clamp, through an aperture in the side of the beam, and a screw-nut, $n$, fitting upon it and screwing against the side of the beam, or against a washer, $w$, between the nut and the beam, the shank $b'$ can be confined to the beam with any degree of firmness that may be thought necessary.

By properly tightening the nut, the tooth may be held immovable under any ordinary strain, and yet be permitted to yield and swing back on its pivot $c$, if at any time it comes in contact with an immovable obstacle. If the straight shank $b$ enters a vertical mortise in the beam, such mortise must be expanded at its lower end, in order to allow the shank to swing back freely on its pivot.

We are aware that an eye-bolt has heretofore been employed for the purpose of confining the tooth of a cultivator in place, and yet of allowing it to yield readily under any sudden and great strain. Such a device is shown in the patent of S. M. Whitney, dated January 15, 1867. We do not claim the device shown in his patent, which has been found to be practically worthless, and the use of which has been generally abandoned; but

We claim as our invention, and desire to secure by Letters Patent the following, viz:

In combination with the mortised beam A and the tooth B, having the shanks $b\ b'$, and pivoted on the bolt $c$, we claim a stirrup-shaped clamp, E, having an oblong or semicircular opening, O, the side $o$ of which, that bears against the shank $b'$, being straight, and said clamp being confined to the beam A, and tightened or loosened by means of a screw-shank, $r$, passing through a slot in the side of the beam, and a screw-nut, $n$, fitting upon it outside of the beam, and screwing against the side of the beam, or against a washer, substantially as described.

To the above specification of our improvement we have signed our hands, this 12th day of May, 1868.

M. F. LOWTH,
T. J. HOWE.

Witnesses:
LEWIS L. WHEELOCK,
J. Q. BRADEN.